(12) United States Patent
Koukouravas et al.

(10) Patent No.: US 8,474,513 B2
(45) Date of Patent: Jul. 2, 2013

(54) AIR-CONDITIONING SYSTEM, ESPECIALLY AUTOMOTIVE AIR-CONDITIONING SYSTEM

(75) Inventors: Evripidis Koukouravas, Neckartenzlingen (DE); Michael Roth, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1024 days.

(21) Appl. No.: 11/630,341

(22) PCT Filed: Jun. 24, 2005

(86) PCT No.: PCT/EP2005/006851
§ 371 (c)(1),
(2), (4) Date: Jul. 30, 2007

(87) PCT Pub. No.: WO2006/000433
PCT Pub. Date: Jan. 5, 2006

(65) Prior Publication Data
US 2007/0271953 A1 Nov. 29, 2007

(30) Foreign Application Priority Data
Jun. 24, 2004 (DE) .......................... 10 2004 030 697

(51) Int. Cl.
*B60H 1/00* (2006.01)
(52) U.S. Cl.
USPC .................. 165/42; 165/43; 165/76; 165/78; 165/103; 165/137; 165/202; 165/203; 237/12.3 A; 237/12.3 B; 454/156; 454/160; 454/161

(58) Field of Classification Search
USPC ................ 165/202, 203, 42, 43, 103, 76, 78, 165/137; 237/12.3 A, 12.3 B; 454/156, 160, 454/161
See application file for complete search history.

(56) References Cited

U.S. PATENT DOCUMENTS

| | | | | |
|---|---|---|---|---|
| 4,821,792 A | * | 4/1989 | Bednarek | 165/231 |
| 4,848,450 A | * | 7/1989 | Lapkowsky | 165/76 |
| 6,536,474 B2 | * | 3/2003 | Akahane | 137/625.44 |
| 2003/0042011 A1 | | 3/2003 | Vincent | |
| 2003/0145978 A1 | | 8/2003 | Tsurushima et al. | |
| 2004/0016536 A1 | | 1/2004 | Auer et al. | |
| 2005/0178538 A1 | | 8/2005 | Vincent | |
| 2006/0060343 A1 | | 3/2006 | Litwing et al. | |
| 2006/0090890 A1 | * | 5/2006 | Klein et al. | 165/203 |

FOREIGN PATENT DOCUMENTS

| | | | |
|---|---|---|---|
| DE | 39 16 816 A1 | | 5/1990 |
| DE | 100 12 972 C1 | | 3/2001 |
| DE | 102 25 109 A1 | | 12/2003 |
| DE | 103 28 275 A1 | | 1/2004 |
| DE | 698 14 506 T2 | | 3/2004 |
| EP | 1 288 031 A1 | | 3/2003 |
| EP | 0 867 319 B1 | | 5/2003 |
| FR | 2724873 A1 | * | 3/1996 |
| GB | 2 217 440 A | | 10/1989 |
| JP | 2000247135 A | * | 9/2000 |

(Continued)

*Primary Examiner* — John Ford
(74) *Attorney, Agent, or Firm* — Foley & Lardner LLP

(57) ABSTRACT

The invention relates to an air-conditioning system (1), especially an automotive air-conditioning system, which comprises a multi-part air conduction housing (1) and components disposed therein, such as at least one heater (H: h). The air conduction housing (1), in the area of at least one component, is configured as a replacement part, especially in the form of a part to be pushed in.

11 Claims, 12 Drawing Sheets

FOREIGN PATENT DOCUMENTS

| | | | |
|---|---|---|---|
| JP | 2002087044 A | * | 3/2002 |
| JP | 2002-219929 A | | 8/2002 |
| JP | 2003-104035 A | | 4/2003 |
| WO | WO 04/000589 A1 | | 12/2003 |

* cited by examiner

Figure 9D:
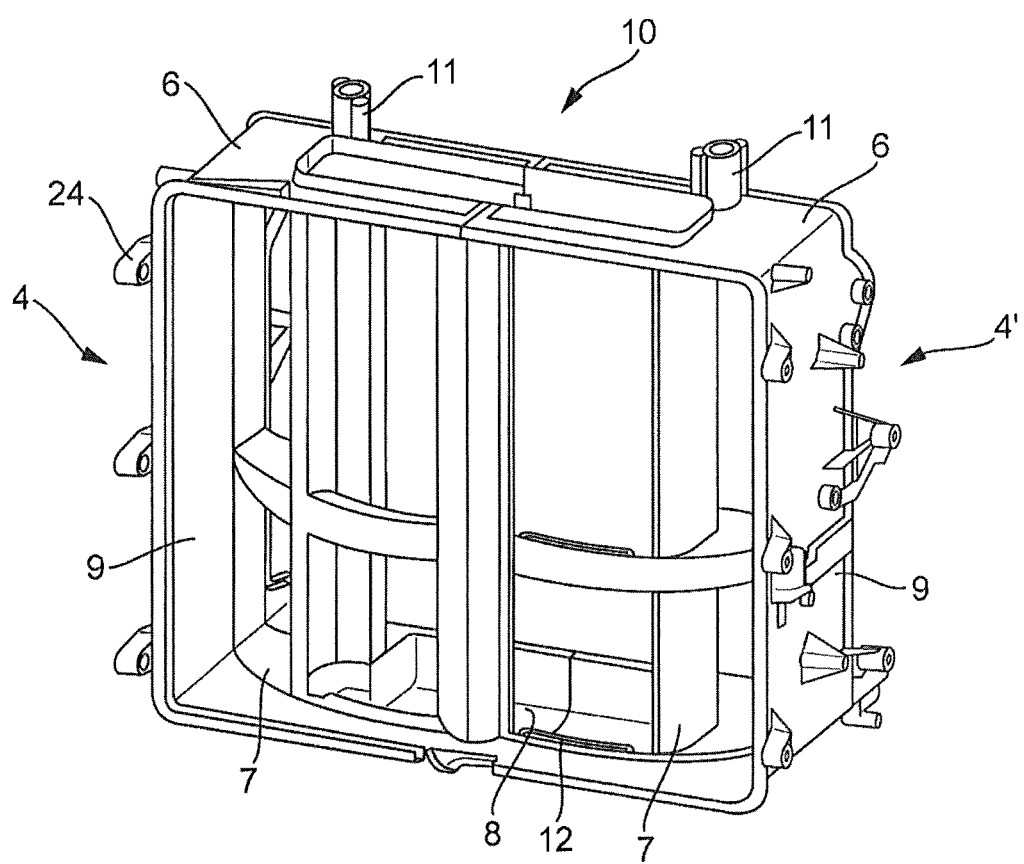

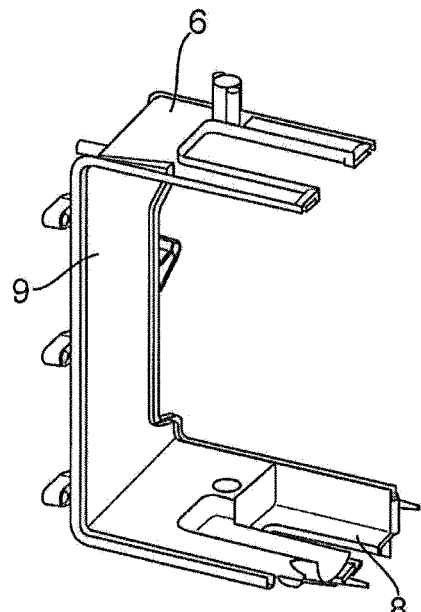
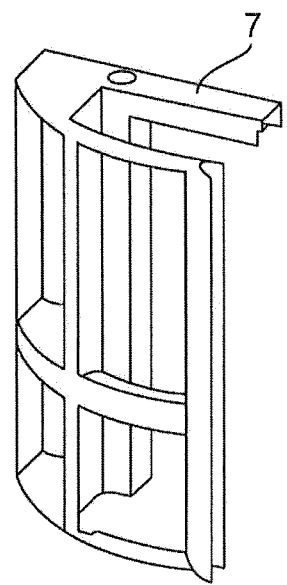
Fig. 9a  Fig. 9b
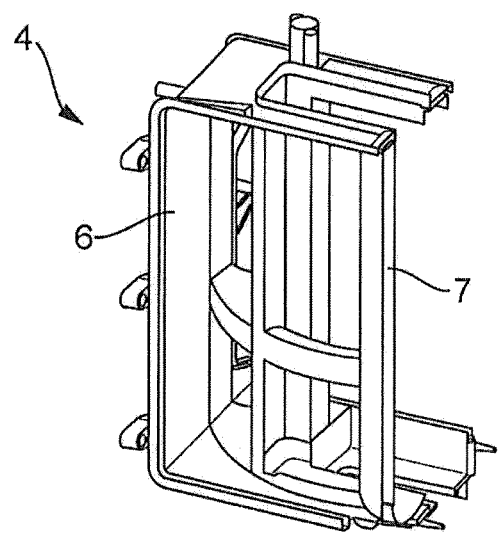
Fig. 9c

AIR-CONDITIONING SYSTEM, ESPECIALLY AUTOMOTIVE AIR-CONDITIONING SYSTEM

The invention relates to an air conditioning system, in particular motor vehicle air conditioning system, according to the preamble of claim 1.

In the case of conventional air conditioning systems, any change leads to a new design of the air conditioning system, in particular of the air guide housing with the air guide ducts arranged therein up to the evaporator, heater and if appropriate additional heater. The result of this is that, the entire air conditioning system must be newly constructed for every variant, with special tools being required for each variant.

EP 1 288 031 A1 discloses a motor vehicle air conditioning system which is of modular design and has means for distributing a main air flow, an evaporator and a heater for heating a second air flow. The air conditioning system is arranged in a housing. There are at least three versions of the modular design of the air conditioning system, specifically for a one-zone, a two-zone and a three-zone air conditioning system which is suitable for generating an air flow of a predefined temperature in the corresponding zones. Here, the external design of the different versions of the air conditioning system is identical regardless of the number of zones. The modular design is formed substantially by a plurality of different inlay parts which divide the housing corresponding to the desired number of zones. Here, inlay parts are installed into the air guide housing in each case corresponding to the desired number of zones. An air conditioning system of said type leaves something to be desired.

It is an object of the invention to provide an improved air conditioning system.

Said object is achieved by means of an air conditioning system having the features of claim 1. Advantageous embodiments are the subject matter of the subclaims.

According to the invention, an air conditioning system, in particular motor vehicle air conditioning system, having a multi-part air guide housing and components, such as at least one heater, arranged therein is provided, with the air guide housing being formed, in the region of at least one component, as an insert part or module. It is preferable for a heater and/or additional heater to be arranged in an insert or to be part of the insert which is arranged in the air guide housing. This permits a design of the ducts and of the flaps, for example temperature mixing flaps, assigned thereto which meets the requirements, that is to say inter alia is matched to the number of air conditioning zones. The arrangement in the insert also permits the expanded use of the air guide housing, since specific designs, for example for one- and two-zone and three- and and four-zone air conditioning systems, can be provided in the insert, such as for example the arrangement of temperature mixing flaps and/or if appropriate also the provision, for example in the case of one-zone and two-zone applications, of covers for ducts which are not required.

The insert part is preferably designed as a slide-in part which can, in a simple way, be pushed from the side of the air guide housing into a slot-like slide-in region formed in the air guide housing.

The slide-in region is preferably arranged between two cold air ducts which are arranged above and below and/or to the sides, so that the air guide housing is of sufficiently stable design and the slide-in region is formed by a slot.

The warm air ducts formed in the air conditioning system are advantageously part of the insert part and/or are delimited by the walls of the insert part. A cold air duct is either arranged in the air guide housing or is likewise part of the insert part.

The insert part is preferably of multi-part design, in particular two-part, three-part or four-part design.

The air conditioning systems are preferably designed so as to be substantially identical in the region of the air guide housing for different numbers of zones, it being possible here for example for zone-specific inlay parts, separating walls and/or covers to be provided, and the individual air conditioning systems differing with respect to the different number of zones by the insert part. This permits a simplified construction of the air conditioning systems with different numbers of zones. It is also relatively easily possible to modify air conditioning systems. The main advantage, however, is the improved service-friendliness with regard to repair or exchange of the heater and/or additional heater.

It is preferable for two insert parts or modules, in particular slide-in parts, to be provided, which can preferably be installed from different sides of the air guide housing. The separation, in particular a central separation, simplifies production and assembly. It is also possible to carry out a repair by removing only one insert part.

Figure 1:
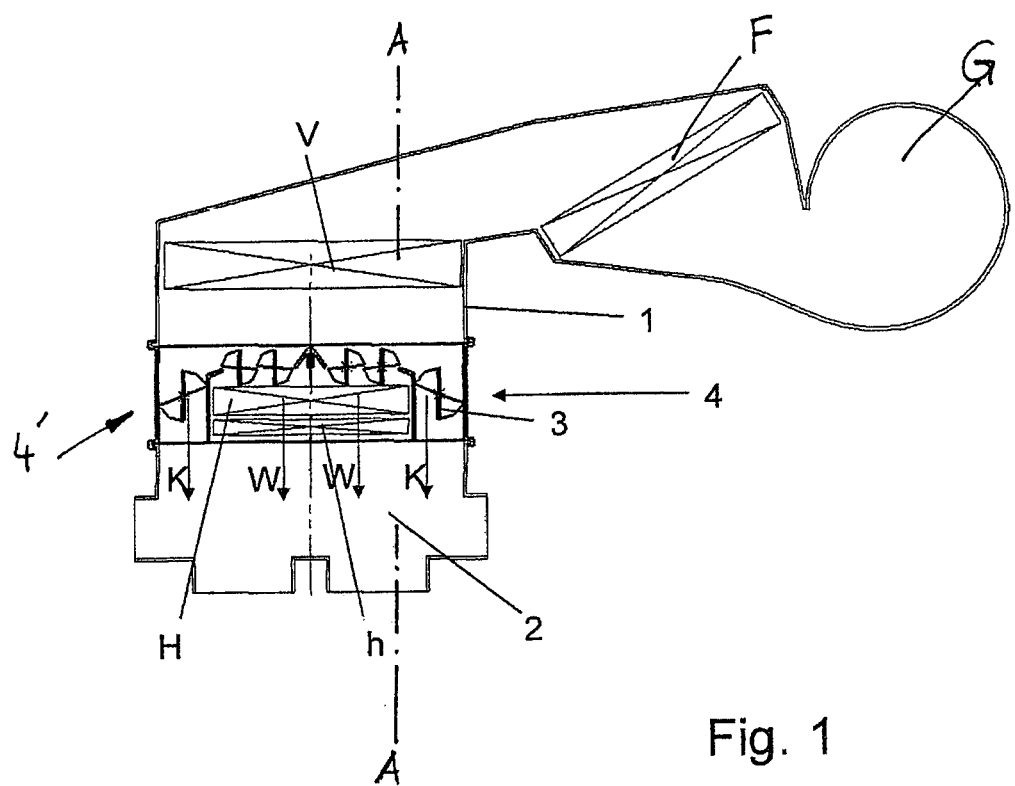
Figure 2:
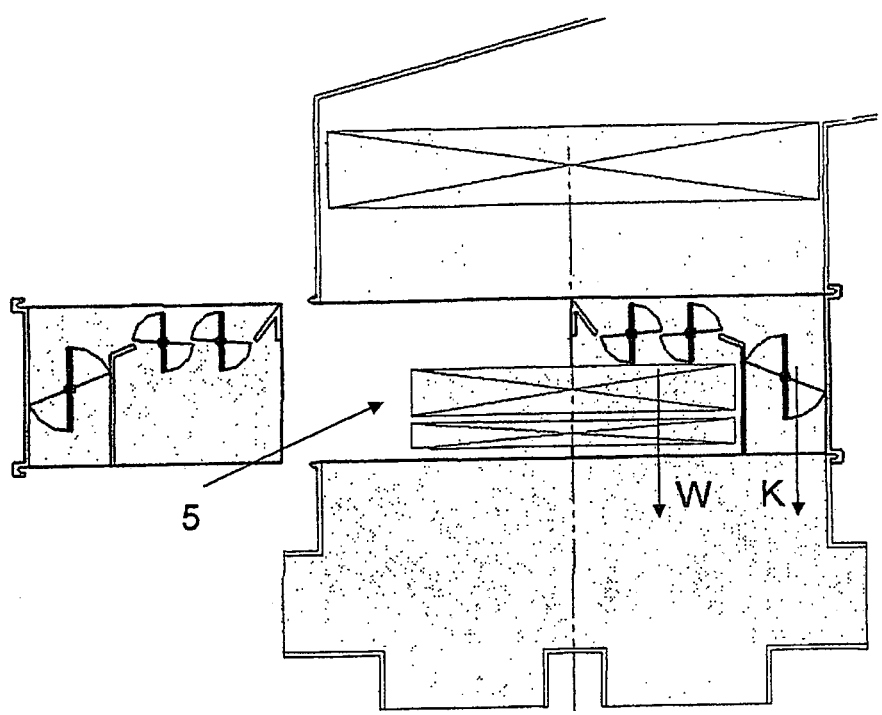
Figure 3:
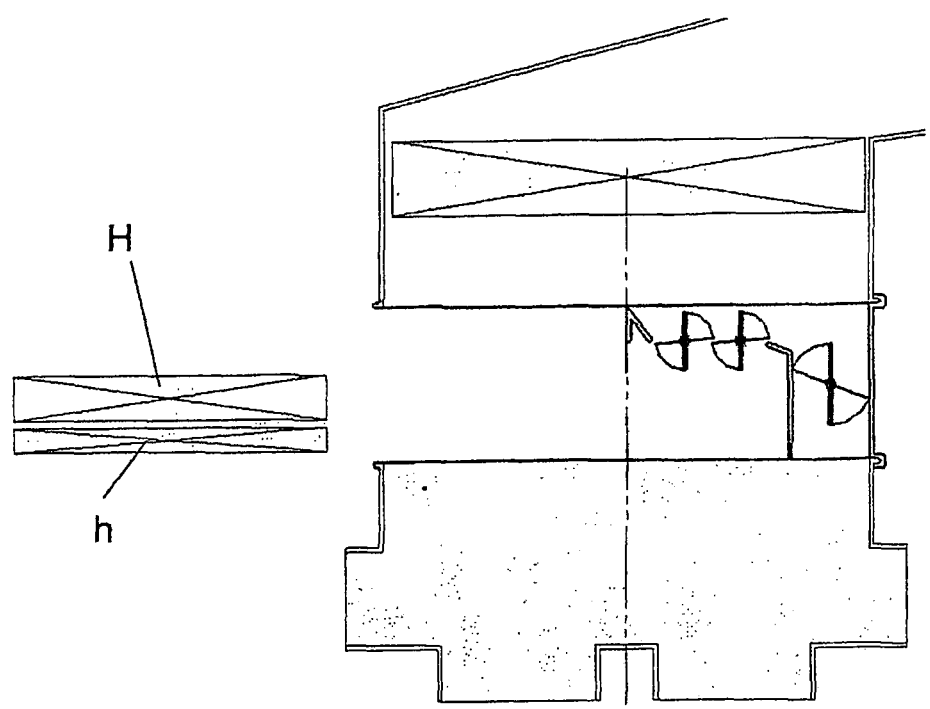
Figure 4:
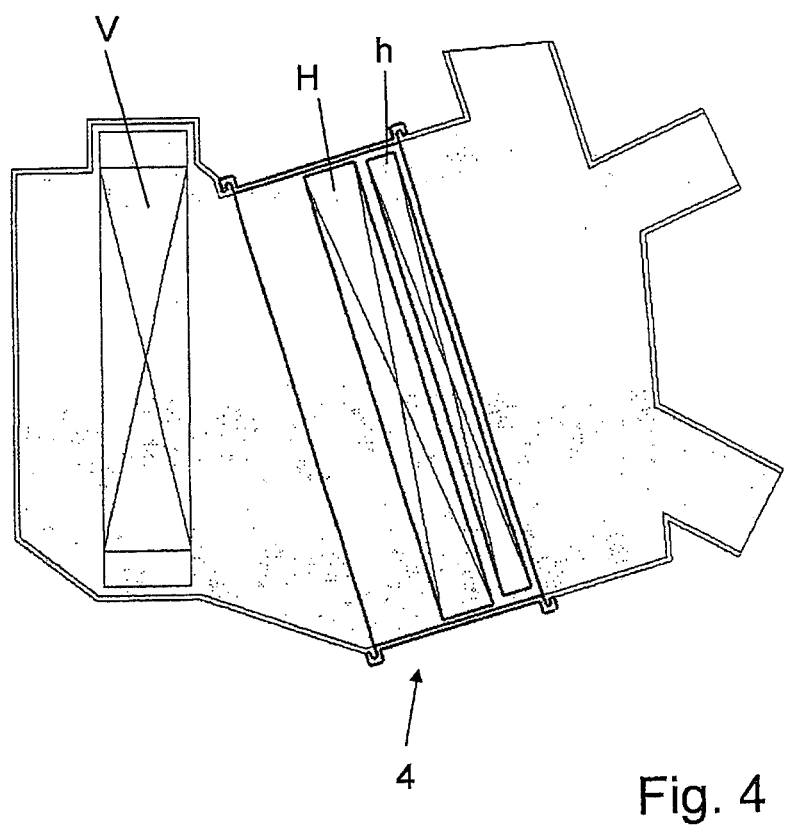
Figure 5:
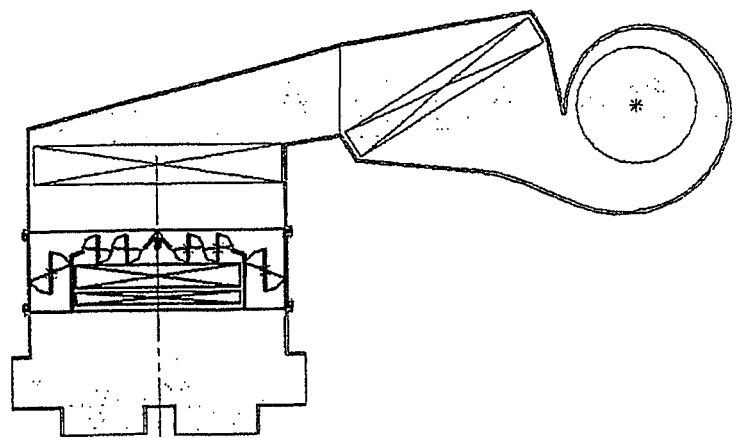
Figure 6:
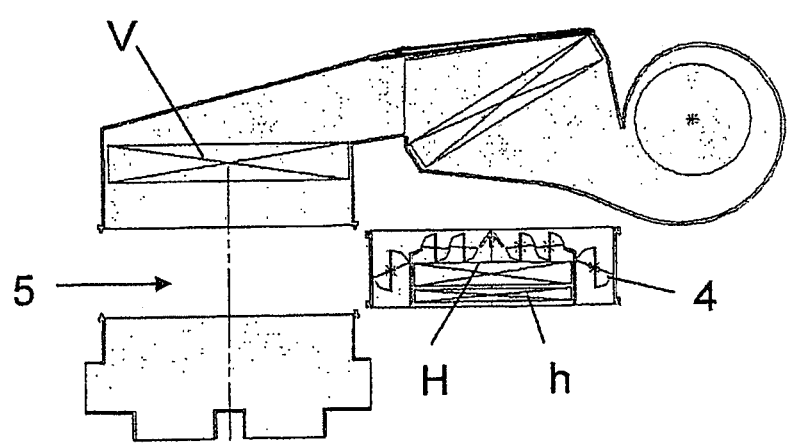
Figure 7:
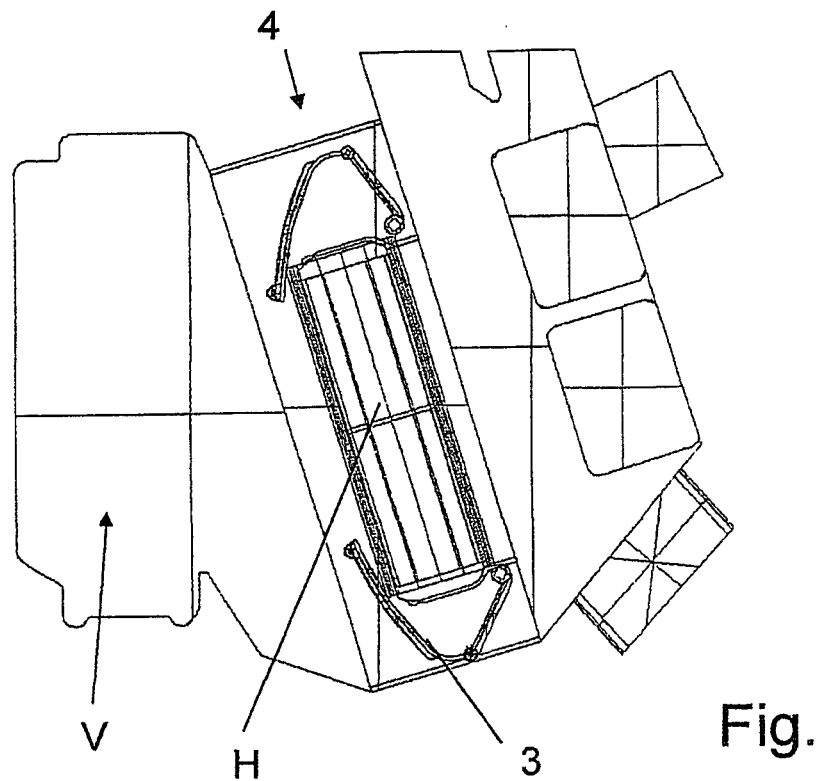
Figure 8:
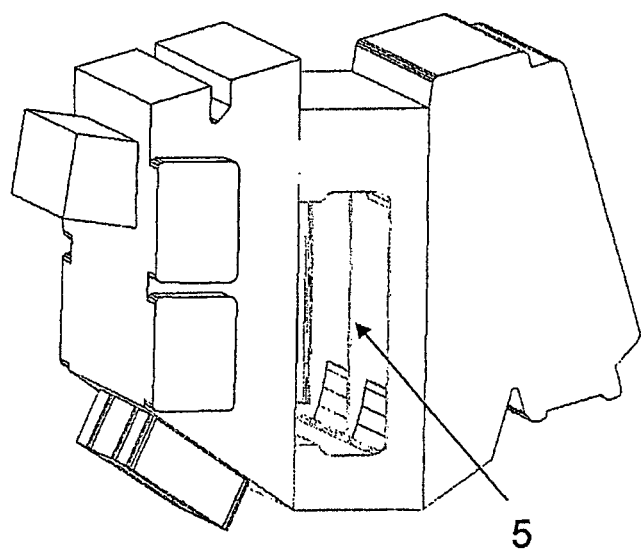
Figure 10A:
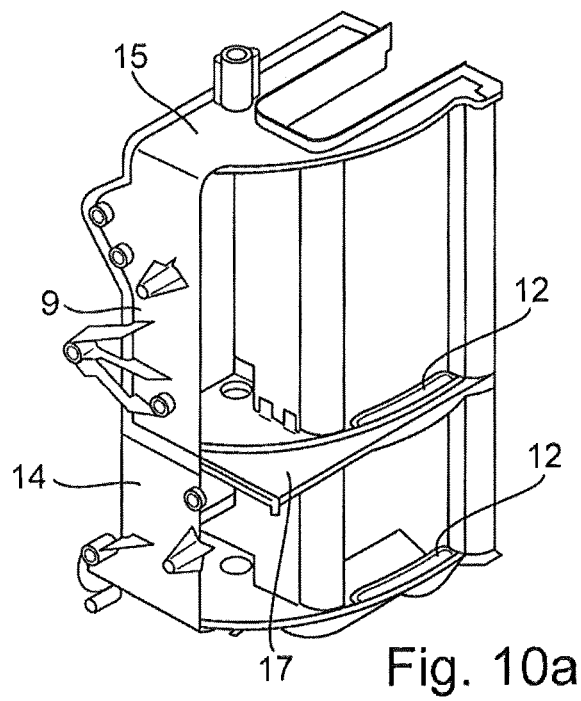
Figure 10B:
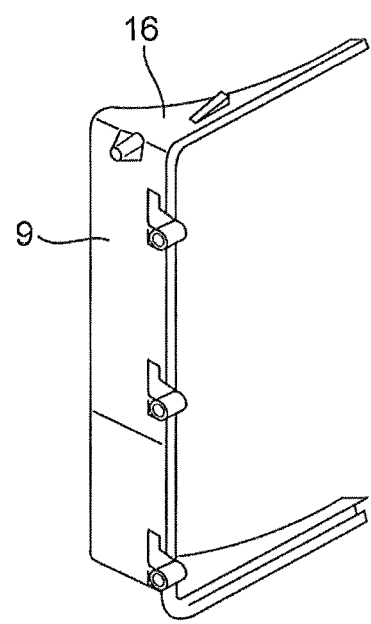
Figure 10C:
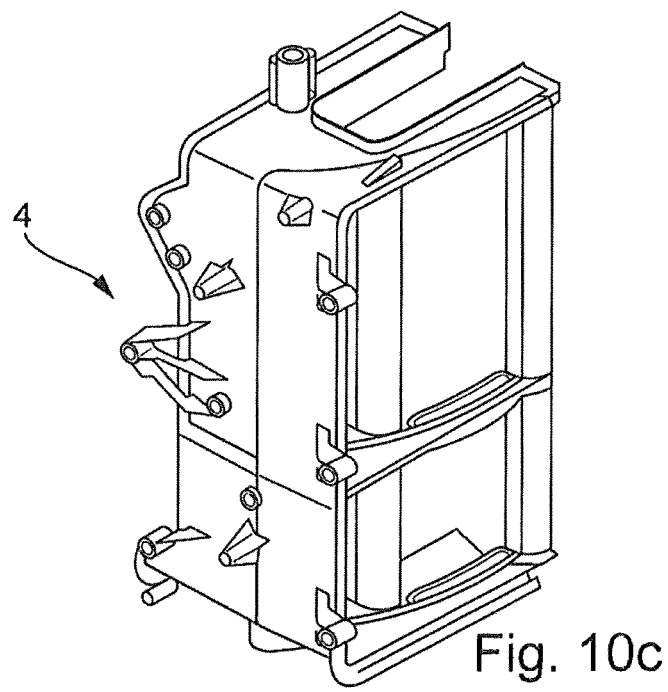
Figure 11:
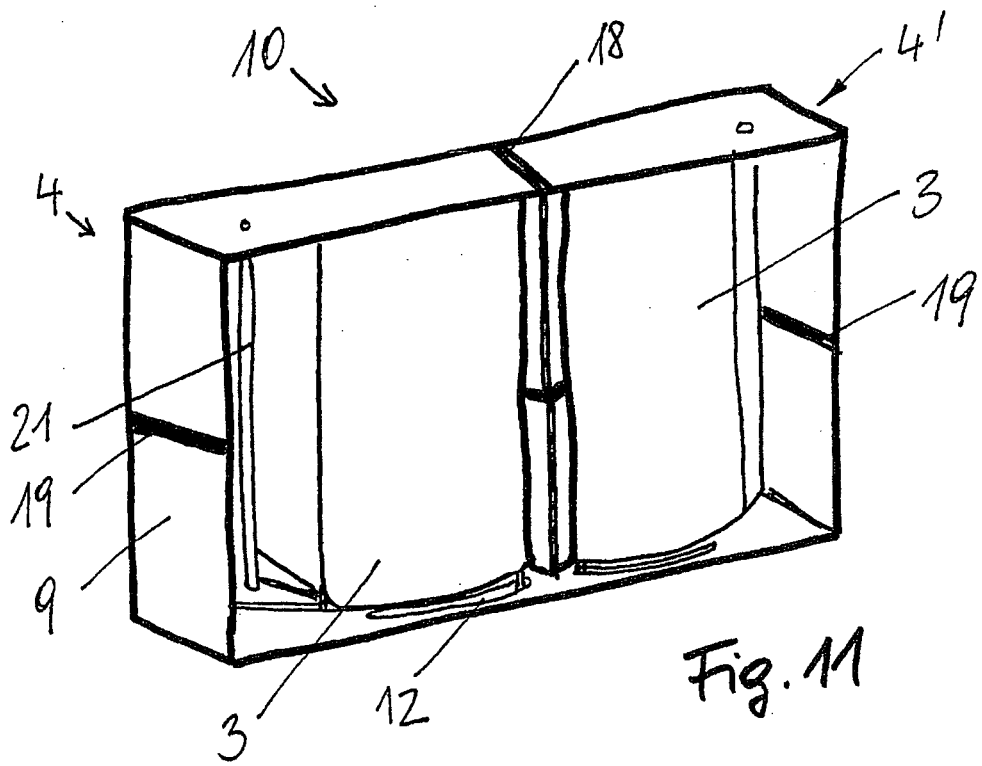
Figure 12:
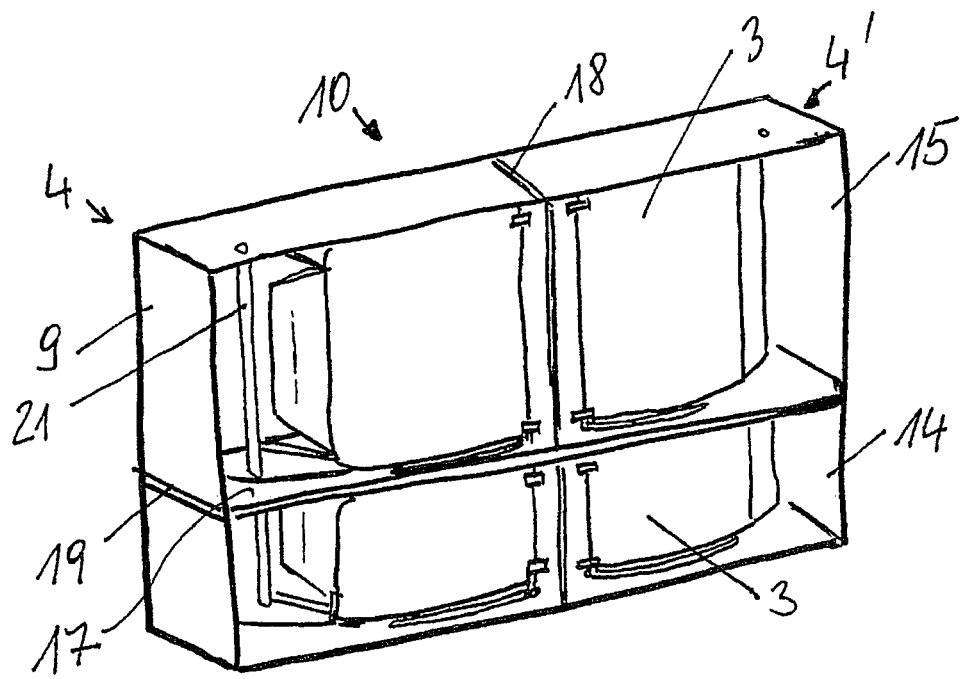
Figure 13:
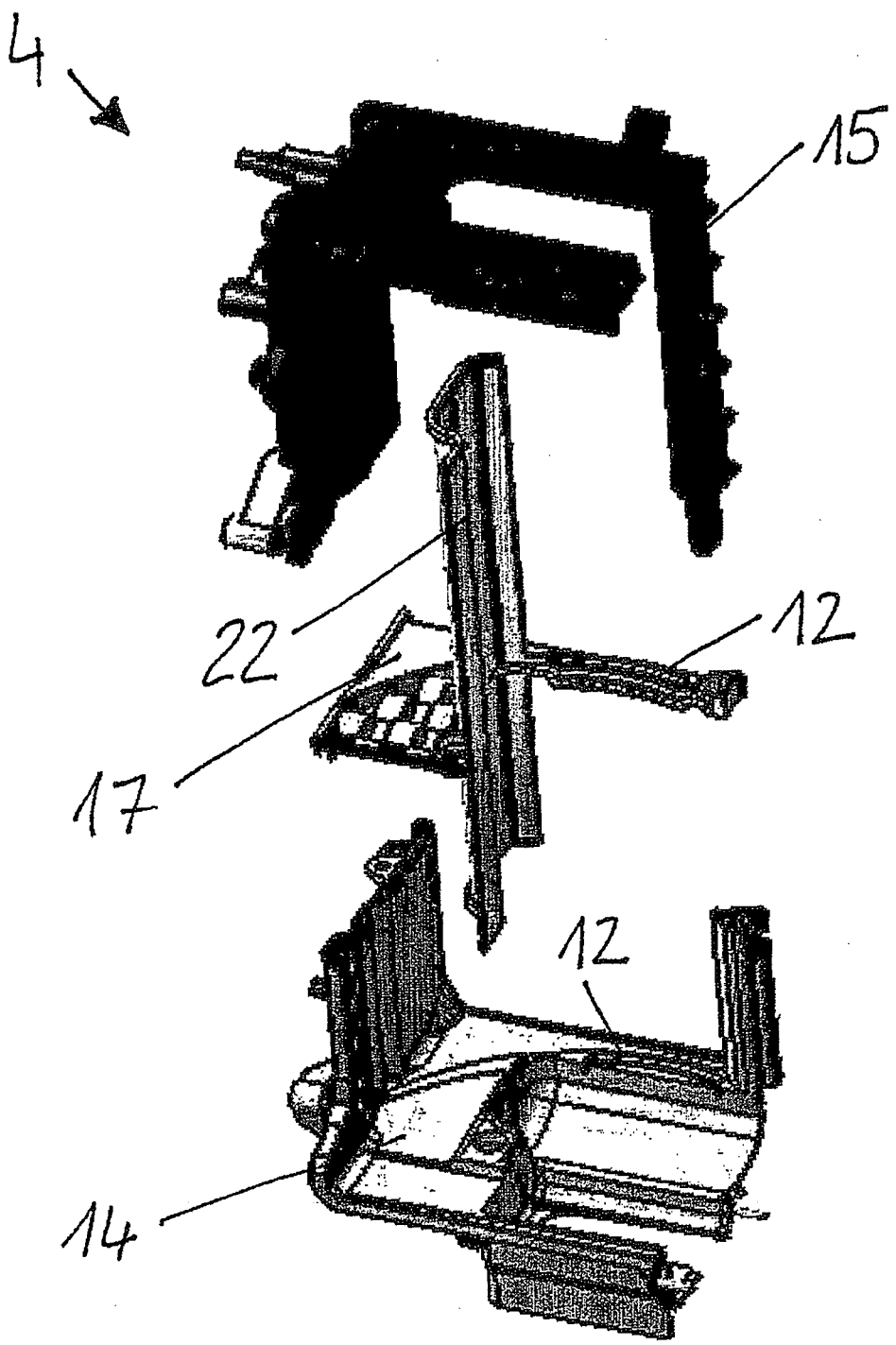
Figure 14:
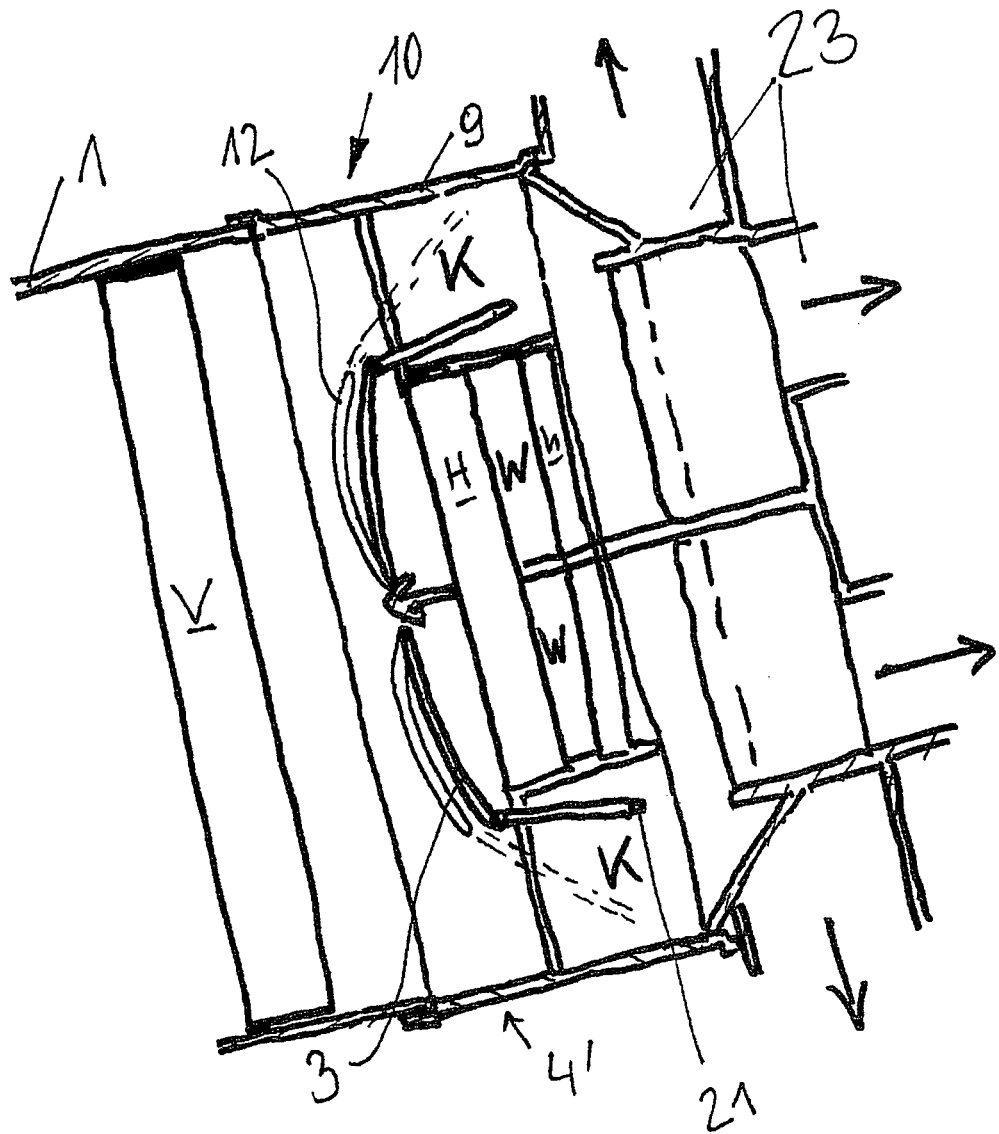

The invention is explained in detail in the following text on the basis of a plurality of exemplary embodiments with variants, partially with reference to the drawing. In the drawing:

FIG. 1 is a schematic sectioned illustration of a motor vehicle air conditioning system according to the first exemplary embodiment in the assembled state, FIG. 2 shows a part of the motor vehicle air conditioning system from FIG. 1 with the module partially removed, FIG. 3 shows a part of the motor vehicle air conditioning system from FIG. 1 with the heater and additional heater removed, FIG. 4 is a sectioned illustration of the first exemplary embodiment from another perspective, FIG. 5 is a schematic sectioned illustration of a motor vehicle air conditioning system according to the second exemplary embodiment in the assembled state, FIG. 6 shows a part of the motor vehicle air conditioning system from FIG. 5 with the module removed, FIG. 7 is a schematic sectioned illustration of a motor vehicle air conditioning system according to the third exemplary embodiment in the assembled state, FIG. 8 is a perspective illustration of the third exemplary embodiment with the module, complete with heater, removed, FIGS. 9*a*-9*d* are perspective illustrations of the fourth exemplary embodiment of an installation part, and individual parts thereof, without the heater and flaps, FIGS. 10*a*-10*c* are perspective illustrations of the fifth exemplary embodiment of a part of an installation part, and individual parts thereof, without the heater and flaps, FIG. 11 is a schematic perspective illustration of the fourth exemplary embodiment of an installation part with the flaps installed, FIG. 12 is a schematic perspective illustration of the fifth exemplary embodiment of an installation part with the flaps installed, FIG. 13 is a schematic perspective illustration of the sixth exemplary embodiment of a module without the heater and flaps, and FIG. 14 is a schematic sectioned illustration through the fourth or fifth exemplary embodiment of an installation part in the installed state.

A motor vehicle air conditioning system, which in the present case is embodied as illustrated in FIG. 1 as a two-zone air conditioning system, has an air guide housing 1 with a heater H, an additional heater h and an evaporator V arranged therein, the air guide housing 1 being embodied as a plastic injection-molded part which, for production and assembly reasons, is of multi-part design. A filter F and a fan G (not illustrated in any more detail) for conveying the air to be air-conditioned are arranged upstream of the evaporator V. A plurality of air ducts 2 and flaps 3 (only temperature mixing flaps are illustrated here) for controlling the air flow are formed and/or arranged in the air guide housing 1 with the aid of inlay parts (not illustrated in any more detail). Provision is for example made of two centrally-arranged warm air ducts W, by means of which the air passing from the evaporator V is guided through and heated by the heater H and the additional heater h, and in each case one cold air duct K arranged at the top and at the bottom, which cold air ducts K conduct the air passing from the evaporator V past the heater H and the additional heater h. The air is moderated in temperature and/or distributed by means of the temperature mixing flaps. It is of course also possible instead of the schematically illustrated two-blade flaps to use single-blade flaps, sliding flaps, roller band cassettes, lamellar flaps and similar flap arrangements.

The heater H and the additional heater h, which is formed by PTC elements, are arranged together with the temperature mixing flaps in two modules 4, 4' which, for example with the outer walls 9, also form a part of the multi-part air guide housing 1. Each module 4, 4' is embodied as an insert part, in the present case as a slide-in part, which can be pushed from the side into a slot-like slide-in region 5 formed by the main part of the air guide housing 1, for which purpose the edges of the main part of the air guide housing 1 and of the module 4 have corresponding guides and seals. The modules 4, 4' are connected to the air guide housing 1 in such a way that the flow profile of the air is adversely affected as little as possible, for which purpose the inner wall of the air guide housing 1 merges substantially continuously into the wall of the modules, so that ideally no edges protrude into the air flow path in the region of the transitions.

An approximately mirror-symmetrical design of individual modules is indicated in the reference symbols by the addition of an apostrophe. For simplicity, this is not carried out for the further components in the following text.

In the first exemplary embodiment, two modules 4, 4' are provided, one for each air conditioning zone, it being possible for the modules 4, 4' to be pushed in and pulled out from different sides or else from the same side. If, for example, the heater H with the additional heater h is to be exchanged, then one of the modules 4, 4' is detached and pulled out (FIG. 2), and the heater H with the additional heater h can subsequently be removed and replaced (FIG. 3). The module 4, 4' is subsequently pushed in again and fastened. FIG. 4 is a sectioned illustration along the plane A-A of FIG. 1. The flap arrangement or the flaps 3 situated between the heater H and the evaporator V are not illustrated in FIG. 4.

In the second exemplary embodiment illustrated in FIGS. 5 and 6, the heater H and additional heater h are directly integrated in a module 4 which extends over the entire width of the air guide housing 1 and likewise comprises the temperature mixing flaps 3. The module 4 likewise forms a slide-in part which is pushed into a correspondingly formed slide-in region 5 from the side of the air guide housing 1.

According to one variant, an arrangement of an evaporator in a similar module is likewise possible. As a result of the possible variations regarding the number of zones, which is associated with the separating walls in the region of the heater and additional heater and in particular has an impact on the number of temperature mixing flaps and/or on a coupling thereof, the modular design is however particularly advantageous in the region of the heater/additional heater.

FIGS. 7 and 8 illustrate a third exemplary embodiment of a four-zone air conditioning system with a heater H, in the present case without an additional heater, it however being entirely possible for an additional heater to also be provided. Said heater H, together with the upper and lower temperature mixing flaps 3 for each side, is part of the module 4 which is inserted into a slot-like slide-in region 5 and can be installed and removed as a unit between the upper and lower cold air ducts in the air guide housing. The evaporator V, which is not illustrated explicitly, is arranged in the left-hand part of FIG. 7 and in the right-hand part of FIG. 8. The temperature mixing flaps 3 of the third exemplary embodiment are combined pivoting and sliding flaps.

According to a variant of the third exemplary embodiment not illustrated in the drawing, a three-zone air conditioning system is provided which has three temperature mixing flaps, specifically two upper temperature mixing flaps and one lower temperature mixing flap.

According to two further variants of the third exemplary embodiment, a two-zone air conditioning system is provided which, in a first embodiment, has two temperature mixing flaps, specifically one for each side, which each taper at the bottom, and in a second embodiment, has four temperature mixing flaps which are coupled to one another.

In a final variant for a one-zone air conditioning system—using the same air guide housing—only one temperature mixing flap is provided, at the top. The lower openings are closed off. Alternatively, it is likewise possible for a temperature mixing flap to be provided at the bottom, which temperature mixing flap is for example coupled to the top temperature mixing flap.

FIGS. 9a to 9d illustrate a further module 4 according to the invention which is of two-part design. Said module 4 is composed substantially of an outer part 6 and an inner part 7. The two parts 6, 7 are joined together to form the module or insert part 4 illustrated in FIG. 9c. A multi-part design is particularly advantageous for the production of said module 4 by means of plastic injection molding. A complex installation part 10 which can be integrated directly into the air guide housing of a motor vehicle air conditioning system is produced according to the illustration in FIG. 9d by joining a module 4 of said type to a substantially mirror-symmetrical further module 4' for example by means of welding, screws, clips or the like. In the present example, in each case one temperature mixing flap (not illustrated in FIG. 9) is provided in the left-hand module 4 and in the right-hand module 4'. Groove-like guides 12 and mounting points 11 for the combined pivoting and sliding flaps used as temperature mixing flaps are provided in the lower and upper regions of the installation part. When the installation part 10 is in the installed state in the air conditioning system, the outer wall regions 9 of the modules 4 and 4' form the wall of the air guide housing 1 of the air conditioning system. For connecting the installation part 10 to the air guide housing, encircling sealing regions are advantageously provided, for example sealing lips, sealing rings and/or a groove or tongue which can be placed in engagement with the corresponding counterpart of the air guide housing. In addition, the installation part is screwed to the air guide housing, with screw domes 24 being formed on the installation part 10 for this purpose. A holding region 8 in the base region of the modules 4, 4' is provided for a heater H and optionally an additional heater h. A simplified exchange of the heater H and/or additional heater h is made possible by means of an insertion opening in the upper region of the modules 4, 4', though the heater H and/or additional heater h can also be removed by removing one or both of the modules 4, 4'.

In the case in particular of multi-zone air conditioning systems and the designs of the air guide housing which can under some circumstances be more complex for this purpose, it can be advantageous for the purpose of simple demolding to design a module 4, 4' according to the invention to be composed of three or more parts. A module or insert part 4 of this type is illustrated in FIGS. 10a to 10c. Here, the module 4 is formed from an upper part 15, a lower part 14 and a frame part 16. The three parts can again be sealingly connected to one another, in particular by means of screws, clips and/or welding. An installation part 10, which again holds a heater H and/or an auxiliary heater h and serves as an air guide and air temperature moderating unit, is formed by means of a substantially mirror-symmetrical module 4 (not illustrated). In further contrast to the exemplary embodiment illustrated in FIG. 9, an intermediate base 17 is provided which, as a separate part, can be integrated into the arrangement or can be connected thereto or is part of the upper part 15 or of the lower part 14. The intermediate base divides the arrangement into upper and lower air guide ducts corresponding to the design of zones for the subsequent air conditioning of the interior space.

A further exemplary embodiment for a three-part design of a module 4, in the present case in an upper part 15, a lower part 14 and an intermediate base 17, is illustrated in FIG. 13. The intermediate base has a web 22 which, in the assembled state, engages by means of its ends with the upper part 15 and the lower part 14.

FIGS. 11 and 12 illustrate in each case one installation part 10 with a corresponding flap arrangement for moderating the temperature of the air passing through. In the installation part shown in FIG. 11, a module 4 is connected to a substantially mirror-symmetrical module 4' at the vertical partition 18. The modules 4, 4' can optionally, but not essentially, be of two-part or three-part design, and can be connected to one another at a horizontal partition 19. Arranged in each of the modules is a pivoting and sliding flap 3 which is mounted in the installation part 10 in a pivotable and displaceable fashion by means of a pivoting axle 21 and by means of a pin which engages in a slot-shaped guide 12. The arrangement of the flaps 3 is mirror-symmetrical about the central plane in the region of the vertical partition 18.

In the present example, the air path through the heating body H is closed, and only the lateral cold air ducts K are open. The pivoting and sliding flaps 3 can be moved up to the inside of the outer wall 9 of the module and in doing so close off the cold air ducts and the path of the air through the heating bodies H, h. When the flap 3 is in intermediate positions, an air mixture of cold and warm air is generated downstream of the installation part 10, which air mixture can then be supplied to the vehicle interior corresponding to the zones of the air conditioning system, in the present case two zones. The two-zone air conditioning system can be turned into a one-zone air conditioning system by means of a simple mechanical coupling arrangement of the two flaps, for example by means of a coupling device attached outside the housing.

In contrast to the exemplary embodiment illustrated in FIG. 11, the arrangement illustrated in FIG. 12 has an intermediate base 17 in the horizontal partition 19. The modules 4, 4' are therefore in each case composed of an upper part 15, a lower part 14 and the intermediate base or intermediate inlay part 17. A design of four flaps 3 makes it possible to provide a four-zone air conditioning system, with the upper flaps 3 for moderating the temperature of the air mass flow into the front space of a vehicle being slightly larger in area than the lower flaps 3 for moderating the temperature of the air mass flow into the rear space of a vehicle.

In order to make a three-zone air conditioning system, with simplified control, from a four-zone air conditioning system during production, a mechanical flap arrangement is provided which, for example, connects the two lower flaps 3 for the rear space so that said lower flaps 3 can be controlled by means of a common control device. Only three control devices, for example electric motors, are therefore required instead of four control devices. The coupling is preferably provided outside the air guide housing 1, so that at least the interior of the air conditioning system is identical for the three-zone and four-zone variants.

It is also possible in principle to make a two-zone or even one-zone air conditioning system, with correspondingly simplified control, from the four-zone air conditioning system by means of corresponding couplings, so that very high production quantities are possible at least for parts of the air guide housing and the installation part, making it possible for production costs to be reduced. It is thus possible, for example, for the front and rear regions or the right-hand side and the left-hand side to be coupled to one another in each case. The installation parts 10 illustrated in FIGS. 11 and 12 can be connected in their entirety to the air guide housing of the air conditioning system.

FIG. 14 shows a section through the installation part 10 from FIG. 11 or 12 in the installed state in an air conditioning system. The openings of the cold air ducts K and of the warm air ducts W are controlled by the flaps 3 by means of a pivoting and sliding movement. The installation part 10 is integrated as a complete insert part into the air guide housing 1 of the air conditioning system, with the walls 9 of the modules 4, 4' forming a part of the air guide housing 1 which has an aperture at the installation point. The installation part 10 is adjoined in the region downstream by the air distributing unit which is formed with air outlets and air ducts 23 and any airflow control means such as flaps and which has the object of supplying the air, whose temperature has been moderated by means of the flaps 3 and the heat exchanger V, H, h, to the individual air outflow regions in the vehicle interior such as ventilation outlets, defrosting outlets or footwell outlets in the front and/or rear region.

The invention claimed is:

1. An air conditioning system for a motor vehicle comprising:
   an air guide housing comprising a slot-like slide-in region;
   a heater; and
   at least two modules configured to be inserted into the slot-like slide-in region, the at least two modules comprising a first module and a second module, the first and second modules each having at least one temperature mixing flap;
   wherein the air guide housing is configured to allow a flow of air to pass therethrough,
   wherein an inner wall of the air guide housing merges into a wall of each of the first and the second modules such that edges of the wall of each of the first and the second modules do not protrude into the flow of air;
   wherein the at least two modules are selectively attachable to the air guide housing in the slot-like slide-in region, and
   wherein the first and the second modules are selectively and slidably removable from different sides of the air guide housing via openings in opposing sides of the slot-like slide-in region.

2. The air conditioning system of claim 1, wherein the first module extends over a first half of a width of the air guide housing and the second module extends over a second half of the width of the air guide housing.

3. The air conditioning system of claim 1, further comprising an additional heater.

4. The air conditioning system of claim 1, wherein the at least one temperature mixing flap of each of the first and the second modules is fixedly integrated into the first and the second modules and forms a part thereof.

5. The air conditioning system of claim 1, further comprising at least one warm air duct arranged centrally and at least one cold air duct arranged on a side of the at least one warm air duct.

6. The air conditioning system of claim 1, further comprising a plurality of cold air ducts.

7. The air conditioning system of claim 6, wherein at least one cold air duct is provided in each of the first and the second modules.

8. The air conditioning system of claim 1, wherein the first and the second modules each have a multi-part design.

9. The air conditioning system of claim 1, further comprising an additional component selected from the group consisting of: an evaporator, a filter, and a mixing chamber.

10. The air conditioning system of claim 1, further comprising an evaporator arranged upstream of the at least two modules in a direction of the flow of air.

11. The air conditioning system of claim 1, wherein a configuration of the first module and the second module are symmetrical, mirrored configurations.

\* \* \* \* \*